US012190778B1

(12) United States Patent
He et al.

(10) Patent No.: US 12,190,778 B1
(45) Date of Patent: Jan. 7, 2025

(54) METHOD FOR DRIVING DISPLAY PANEL, DRIVE CHIP AND DISPLAY DEVICE

(71) Applicant: Shenzhen China Star Optoelectronics Semiconductor Display Technology Co., Ltd., Guangdong (CN)

(72) Inventors: Jhenwei He, Guangdong (CN); Yuhua Chang, Guangdong (CN)

(73) Assignee: SHENZHEN CHINA STAR OPTOELECTRONICS SEMICONDUCTOR DISPLAY TECHNOLOGY CO., LTD.

( * ) Notice: Subject to any disclaimer, the term of this patent is extended or adjusted under 35 U.S.C. 154(b) by 0 days.

(21) Appl. No.: 18/401,472

(22) Filed: Dec. 30, 2023

(30) Foreign Application Priority Data

Sep. 28, 2023 (CN) ........................ 202311286463.4

(51) Int. Cl.
*G09G 3/20* (2006.01)

(52) U.S. Cl.
CPC ......... *G09G 3/2074* (2013.01); *G09G 3/2003* (2013.01); *G09G 2320/0233* (2013.01)

(58) Field of Classification Search
None
See application file for complete search history.

(56) References Cited

U.S. PATENT DOCUMENTS

| | | | | |
|---|---|---|---|---|
| 8,581,823 B2 * | 11/2013 | Min | G09G 3/3614 345/96 |
| 8,593,440 B2 * | 11/2013 | Bae | G09G 3/3688 345/204 |
| 9,715,861 B2 * | 7/2017 | Kim | G09G 3/3614 |
| 11,756,495 B2 * | 9/2023 | Zhang | G09G 3/3614 345/690 |
| 2017/0069278 A1 * | 3/2017 | Kim | G09G 3/3614 |
| 2018/0226045 A1 * | 8/2018 | Sohn | G02F 1/13306 |
| 2019/0012978 A1 * | 1/2019 | Wen | G09G 3/3677 |

* cited by examiner

*Primary Examiner* — Matthew Yeung
(74) *Attorney, Agent, or Firm* — PV IP PC; Wei Te Chung

(57) ABSTRACT

A method for driving a display panel, a drive chip and a display device. A plurality of sub-pixels form sub-pixel rows and columns. Sub-pixels in a same row have a same color, and colors of the sub-pixels in each sub-pixel row is different from that of the sub-pixels in an adjacent row. The method includes driving the sub-pixels to display in frames. Each sub-pixel column includes a plurality of sub-pixel groups. 2n sub-pixels are provided between every two sub-pixel groups connected to a corresponding data line, and the 2n sub-pixels are connected to an another adjacent data line, with n being an integer greater than or equal to 0. In a same frame, among the sub-pixels, in any two adjacent sub-pixel columns, whose colors are the same and have the high grayscale data compensation state, at least one sub-pixel has a polarity different from that of other sub-pixels.

20 Claims, 5 Drawing Sheets

METHOD FOR DRIVING DISPLAY PANEL, DRIVE CHIP AND DISPLAY DEVICE

CROSS-REFERENCE TO RELATED APPLICATION

This application claims priority to and the benefit of Chinese Patent Application No. 202311286463.4, filed on Sep. 28, 2023, the disclosure of which is incorporated herein by reference in its entirety.

TECHNICAL FIELD

The present disclosure relates to the field of display technologies, and more particularly, to a method for driving a display panel, a drive chip, and a display device.

BACKGROUND

Trigate (Three-Gate) drive architecture is an important cost-saving drive design for LCD (Liquid Crystal Display), which increases the number of gate lines by a factor of three using GOA (Gate driver On Array), so that the number of data lines can be changed to ⅓ of that of ordinary LCD, thereby achieving cost-saving purposes. To further save overall equipment costs, LCDs typically use 4-Domain VA (4-Domain Vertical Alignment) technology to increase penetration rates to save backlight costs. As described above, effective application of an angle-of-view improvement algorithm, in cooperation with Trigate+4Domain VA, is an important requirement for improving image quality.

SUMMARY

An embodiment of the present disclosure provides a method for driving a display panel, the display panel comprising a plurality of data lines and a plurality of sub-pixels electrically connected to the plurality of data lines; the plurality of the sub-pixels including a plurality of first sub-pixels, a plurality of second sub-pixels, and a plurality of third sub-pixels, the plurality of sub-pixels being arranged in intersecting row and column directions to form a plurality of sub-pixel rows arranged in the column direction, and to form a plurality of sub-pixel columns arranged in the row direction, the plurality of sub-pixel rows including a plurality of first sub-pixel rows, a plurality of second sub-pixel rows, and a plurality of third sub-pixel rows that are alternately arranged, display colors of a plurality of the sub-pixels in a same one of the sub-pixel rows being the same, display colors of the sub-pixels in the first sub-pixel row, display colors of the sub-pixels in the second sub-pixel row, and display colors of the sub-pixels in the third sub-pixel row being different; the driving method comprising: driving a plurality of the sub-pixels to display in a plurality of frames, wherein each of the sub-pixels has one of a high grayscale data compensation state and a low grayscale data compensation state and has one of a positive polarity and a negative polarity in each of the frames; wherein each of the sub-pixel columns includes a plurality of sub-pixel groups including a first sub-pixel group, a third sub-pixel group, and a second sub-pixel group located between the first sub-pixel group and the third sub-pixel group, the first sub-pixel group and the third sub-pixel group being connected to a corresponding one of the data lines, the second sub-pixel group being connected to another adjacent one of the data lines and including 2n sub-pixels of the plurality of sub-pixels, with n being an integer greater than or equal to 0; wherein in a same frame, among a plurality of the sub-pixels, in any two adjacent ones of the sub-pixel columns, whose display colors are the same and have the high grayscale data compensation state, at least one of the sub-pixels has a polarity different from that of other ones of the sub-pixels.

An embodiment of the present disclosure further provides a drive chip configured to execute program instructions to implement the method described above.

An embodiment of the present disclosure further provides a display device including a display panel; and a drive chip electrically connected to the display panel and configured to execute program instructions to implement the method described above.

BRIEF DESCRIPTION OF THE DRAWINGS

In order that the technical solution in the embodiments of the present disclosure may be more clearly described, reference will now be made briefly to the accompanying drawings required for the description of the embodiments, and it will be apparent that the accompanying drawings in the description below are merely some of the embodiments of the present disclosure, and other drawings may be made available by person skilled in the art without involving any inventive effort.

DETAILED DESCRIPTION

Figure 1:
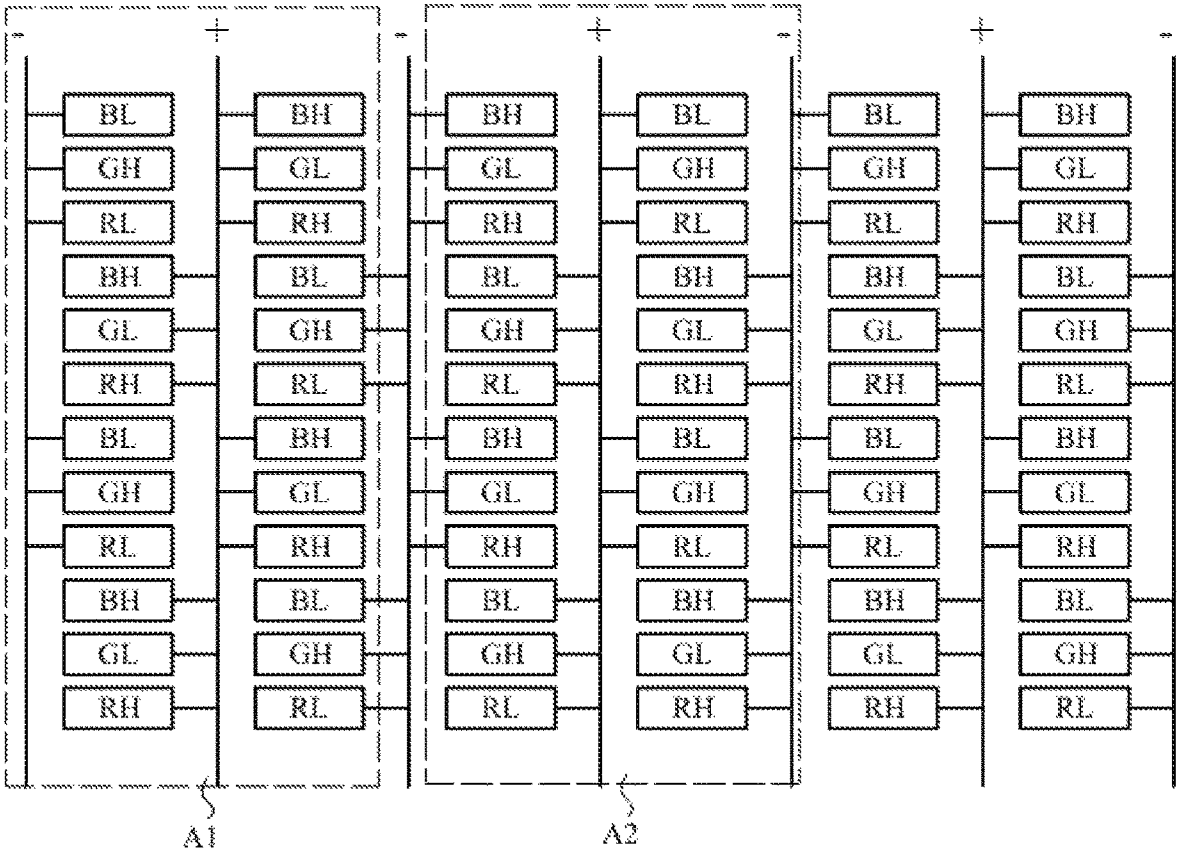
FIG. 1 is a schematic diagram of a planar structure of a display panel according to an embodiment of the present disclosure.

The following will provide a clear and complete description of the technical solution in the embodiments of the present disclosure, in conjunction with the accompanying drawings. Obviously, the described embodiments are only a portion of the embodiments of the present disclosure, and not all of them. Based on the embodiments in the present disclosure, all other embodiments obtained by person skilled in the art without involving any creative labor fall within the scope of protection of the present disclosure. Furthermore, it should be understood that the specific embodiments described herein are only intended to illustrate and explain the present disclosure, and are not intended to limit the present disclosure. In the present disclosure, unless otherwise specified, directional words used herein such as "up" and "down" usually refer to up and down directions of a device in actual use or an operational state, and in particular, to directions as shown in the drawings. References of "inside" and "outside" are made with respect to an outline of the device.

In the related art, the Trigate drive architecture may have severe head-shaking lines when cooperated with the angle-of-view improvement algorithm. As shown in FIG. 1, compensation states of a sub-pixel include a high grayscale data compensation state (represented by H) and a low grayscale data compensation state (represented by L), and polarities of the sub-pixel includes a positive polarity (represented by +) and a negative polarity (represented by −). The human eye is sensitive to green color. A green sub-pixel G with a high grayscale data compensation state H is taken as an example. The polarity of the green sub-pixel G with high grayscale data compensation state H in two adjacent sub-pixel columns of the first region A1 is negative −, while the polarity of the green sub-pixel G with high grayscale data compensation state H in two adjacent sub-pixel columns of the second region A2 is positive +. The polarities in the two cases are completely opposite, resulting in a significant difference in terms of polarity between two adjacent sub-pixel columns of the first region A1 and the second region A2.

The green sub-pixels GH with a high grayscale data compensation state of the first region A1 and the green sub-pixels GH with a high grayscale data compensation state of the second region A2 may be polarity-switched in different frames. Thus, when a human head is stationary, the luminance of the first region and the second region is averaged in time, so that human eyes are not prone to notice luminance unevenness. However, as soon as the head moves, time-averaged effect is destroyed, the human eyes can easily perceive that the luminance is uneven, thereby severe head-shaking lines occur.

Figure 2:
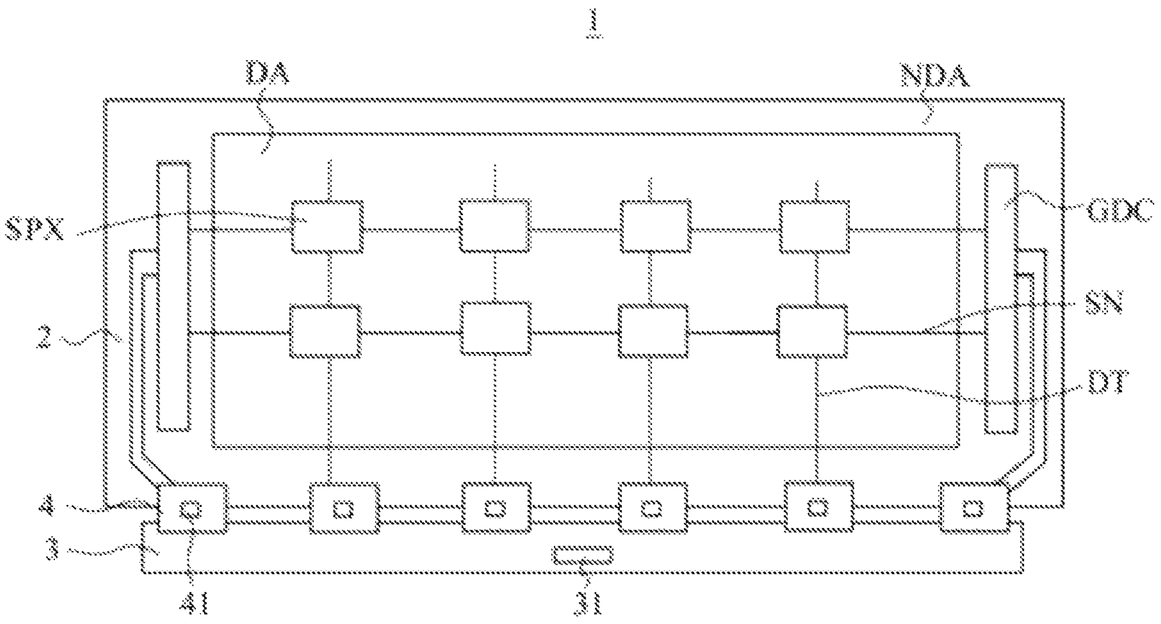
FIG. 2 is a schematic diagram of a planar structure of a display device according to an embodiment of the present disclosure.

As shown in FIG. 2, an embodiment of the present disclosure provides a display device 1. The display device 1 may include a display panel 2, a circuit board 3, and a COF (Chip On Film) 4. The display panel 2 may be an LCD. The circuit board 3 may be a rigid printed circuit board. The COF 4 may be a flexible circuit board.

The display panel 2 includes a display area DA and a non-display area NDA. The display area DA may be an area for configuration of sub-pixels SPX for displaying images. The non-display area NDA may be an area for configuration of a drive unit for supplying driving signals to the sub-pixels SPX and of some lines, such as power lines, connecting to the drive unit. The non-display area NDA may be provided on at least one side of the display area DA. The non-display area NDA may at least partially surround a periphery of the display area DA.

The display panel 2 includes a plurality of sub-pixels SPX, a plurality of data lines DT, a plurality of scan lines SN, and a gate drive circuit GDC. The plurality of sub-pixels SPX are located in the display area DA. The gate drive circuit GDC is located in the non-display region NDA, and drives a plurality of rows of the sub-pixels SPX through the plurality of scan lines SN to open the plurality of rows of the sub-pixels SPX row-by-row. Meanwhile, the plurality of data lines DT sequentially loads data signals to the plurality of rows of the sub-pixels SPX so that the display panel 2 displays a complete frame of picture within a duration of one frame.

The COF 4 includes a source drive chip 41 for transmitting the data signals to the plurality of data lines DT.

The circuit board 3 comprises a timing control chip 31. The timing control chip 31 is electrically connected to the source drive chip 41 and the gate drive circuit GDC to control timings thereof.

Figure 3:
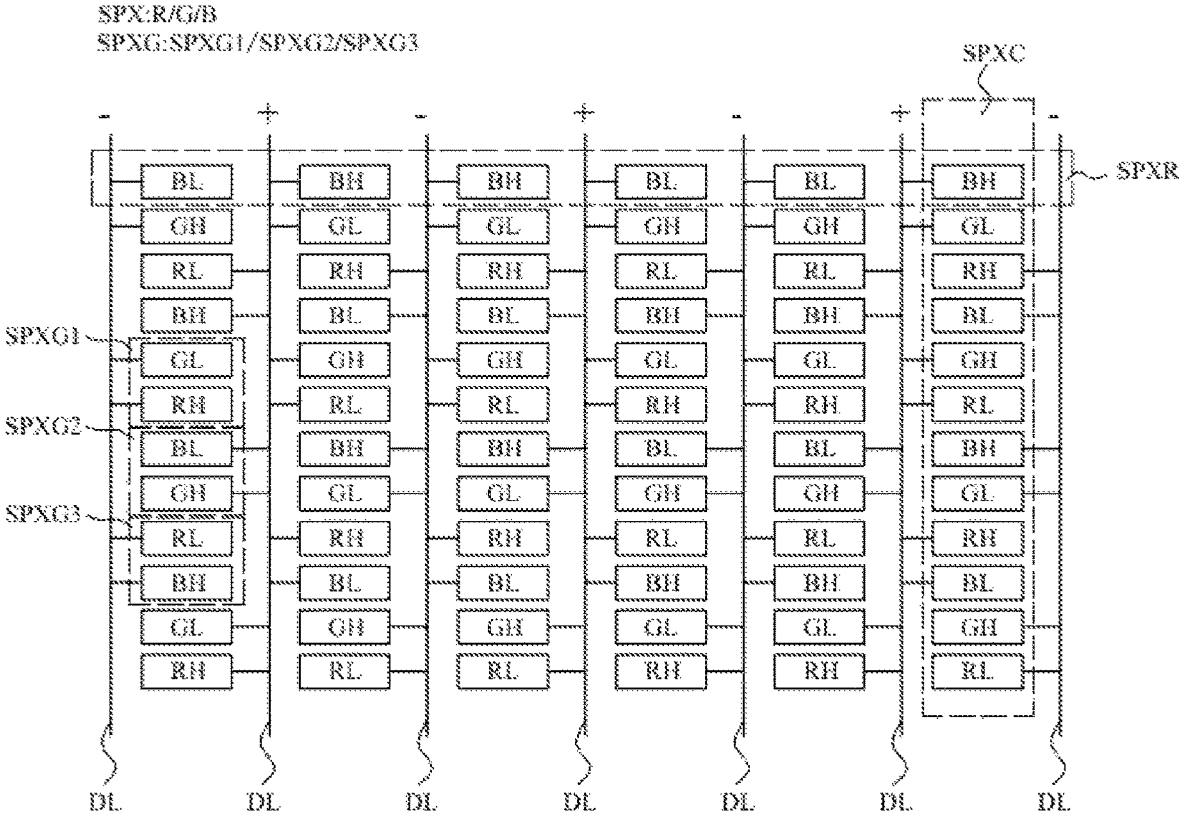
FIG. 3 is a schematic diagram of a planar structure of a display panel according to an embodiment of the present disclosure.
Figure 4:
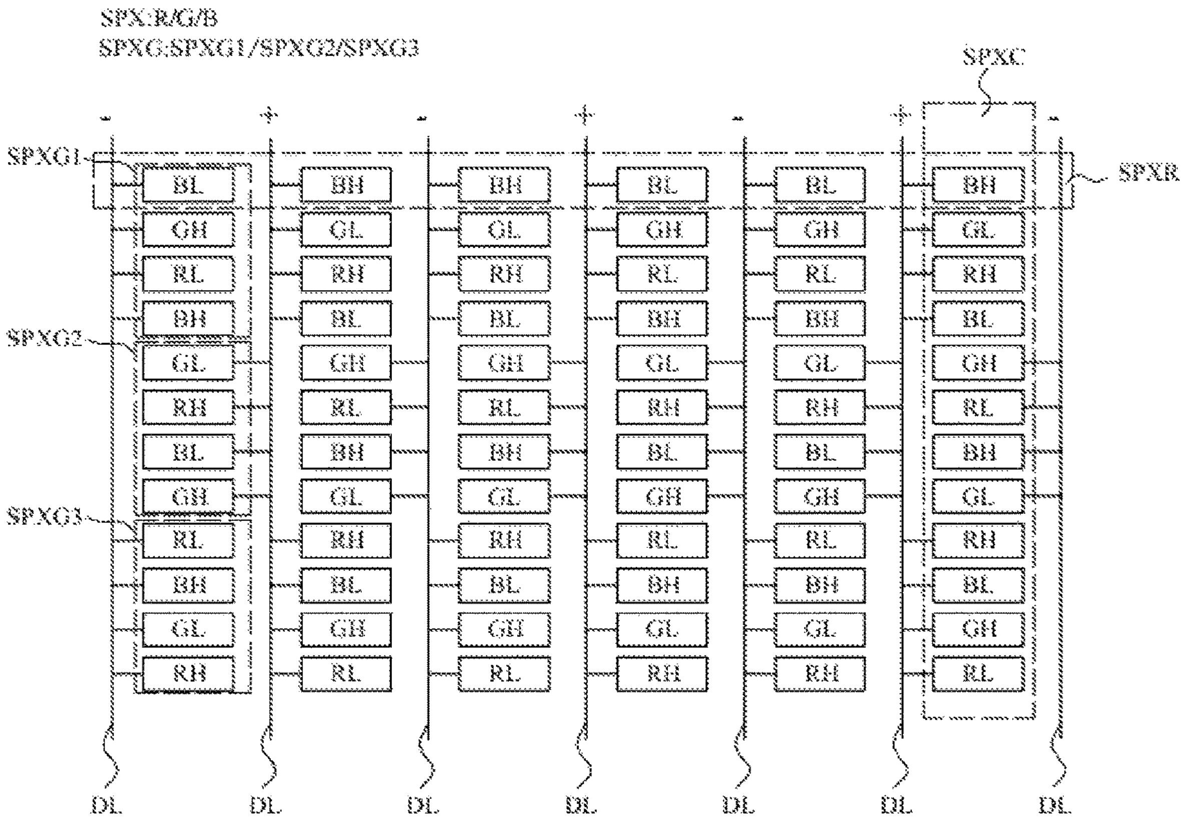
FIG. 4 is a schematic diagram of a planar structure of a display panel according to an embodiment of the present disclosure.
Figure 5:
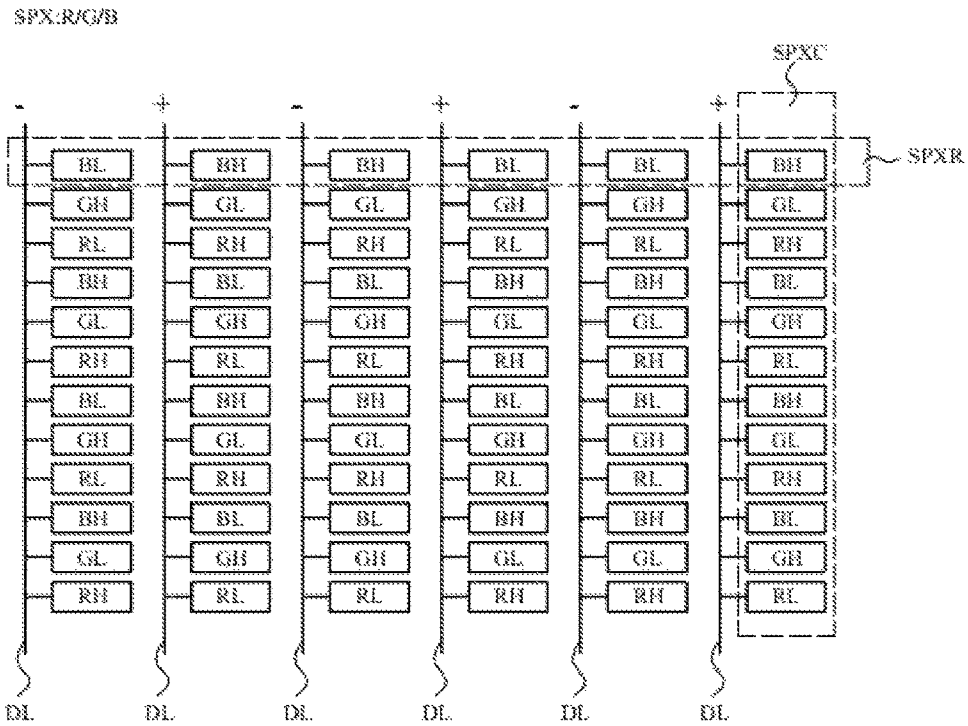
FIG. 5 is a schematic diagram of a planar structure of a display panel according to an embodiment of the present disclosure.

As shown in FIGS. 3 to 5, the plurality of sub-pixels SPX are arranged in intersecting row and column directions to form a plurality of sub-pixel rows SPXR arranged in the column direction, and to form a plurality of sub-pixel columns SPXC arranged in the row direction. The plurality of sub-pixels SPX includes a plurality of first sub-pixels B, a plurality of second sub-pixels G, and a plurality of third sub-pixels R. The plurality of sub-pixel rows SPXR includes a plurality of first sub-pixel rows, a plurality of second sub-pixel rows, and a plurality of third sub-pixel rows that are alternately arranged. Optionally, the first sub-pixel B is a blue sub-pixel, the second sub-pixel G is a green sub-pixel, and the third sub-pixel R is a red sub-pixel. Of course, the types of the first sub-pixel B, the second sub-pixel G, and the third sub-pixel R are not limited thereto. Herein, display colors of the sub-pixels SPX in a same sub-pixel row SPXR are the same, and display colors of the sub-pixels SPX in adjacent sub-pixel rows SPXR are different. That is, the plurality of sub-pixels SPX form a Trigate drive architecture.

Each of the sub-pixel columns SPXC includes a plurality of sub-pixel groups SPXG including a sub-pixel group SPXG1 (i.e., a first sub-pixel group), a sub-pixel group SPXG2 (i.e., a second sub-pixel group), and a sub-pixel group SPXG3 (i.e., a third sub-pixel group), the sub-pixel group SPXG2 being located between the sub-pixel group SPXG1 and the sub-pixel group SPXG3. The sub-pixel group SPXG1 and the sub-pixel group SPXG3 are connected to a corresponding one of the data lines DL. The sub-pixel group SPXG2 includes 2n sub-pixels of the sub-pixels SPX, and the sub-pixel group SPXG2 is connected to another adjacent data line DL, where n is an integer, for example, n is 0 or a positive integer. That is, the present embodiment provides a new design in which an even number of sub-pixels SPX are interspersed in each pixel column to flip pixel polarity.

Based on the new design described above, in a same frame, among a plurality of the sub-pixels SPX, in any two adjacent ones of the sub-pixel columns SPXC, whose display colors are the same and have a high grayscale data compensation state H, at least one of the sub-pixels SPX has a polarity different from that of other ones of the sub-pixels SPX.

As such, the present embodiment provides a new design in which an even number of sub-pixels SPX are interspersed in each pixel column to flip pixel polarity so that in any two adjacent ones of the sub-pixel columns SPXC, there will be no situation where polarities of a plurality of the sub-pixels SPX with a same display color and a high grayscale data compensation state H are all either positive + or negative −, thereby decreasing differences in terms of polarities between a plurality of the sub-pixels SPX with a same display color and a high grayscale data compensation state H in four adjacent sub-pixel columns SPXC, which mitigates head-shaking lines perceived by human eyes with a shaking head as a result of luminance variations produced by polarity changes in an area with a large difference in polarity.

Embodiment 1

Referring to FIG. 3, in the present embodiment, n is a positive integer, for example, one (1). That is, in each of the sub-pixel columns SPXC, two sub-pixels SPX are interspersed to flip pixel polarity.

Each of the sub-pixel columns SPXC includes a plurality of sub-pixel groups SPXG, each of the sub-pixel groups SPXG including 2 (i.e., 2n) of the sub-pixels SPX. The plurality of sub-pixel groups SPXG includes a sub-pixel group SPXG1 (i.e., a first sub-pixel group), a sub-pixel group SPXG2 (i.e., a second sub-pixel group), and a sub-pixel group SPXG3 (i.e., a third sub-pixel group), where the sub-pixel group SPXG2 is located between the sub-pixel group SPXG1 and the sub-pixel group SPXG3. Each of the sub-pixel columns SPXC is connected between two adjacent ones of the data lines DL. A sub-pixel group SPXG is provided between every two of the sub-pixel groups SPXG connected to one of the data lines DL, and the sub-pixel group SPXG is connected to an another adjacent one of the data lines DL. Polarities of a plurality of the sub-pixels SPX in a plurality of the sub-pixel groups SPXG connected to a same one of the data lines DL are the same, and polarities of a plurality of the sub-pixels SPX in a plurality of the sub-pixel groups SPXG connected to two adjacent ones of the data lines DL are opposite. As such, the present embodiment provides a new design in which two sub-pixels SPX are interspersed in each pixel column to flip pixel polarity.

In a same one of the sub-pixel columns SPXC, grayscale data compensation states of two adjacent ones of the sub-pixels SPX are opposite. For example, in the first three sub-pixels SPX in a last column of the sub-pixel columns SPXC, grayscale data compensation states of the first sub-pixel B, the second sub-pixel G, and the third sub-pixel R are a low grayscale data compensation state L, a high grayscale data compensation state H, and the low grayscale data compensation state L, respectively. In a same one of the sub-pixel rows SPXR, the grayscale data compensation states of two adjacent ones of the sub-pixels SPX alternate between being opposite and being the same. For example, in the first six sub-pixels SPX in a first row of the sub-pixel rows SPXR, grayscale data compensation states of the six sub-pixels SPX are a low grayscale data compensation state L, a high grayscale data compensation state H, the high grayscale data compensation state H, the low grayscale data compensation state L, the low grayscale data compensation state L, and the high grayscale data compensation state H.

Among a plurality of the sub-pixels SPX, in a same one of the sub-pixel columns SPXC, whose display colors are the same and have a high grayscale data compensation state H, polarities of two adjacent ones of the sub-pixels SPX are opposite. For example, in a plurality of second sub-pixels G having the high grayscale data compensation state H in the first column of the sub-pixel columns SPXC, polarities of the plurality of second sub-pixels G are negative polarity "−" and positive polarity "+" successively.

As such, in any two adjacent ones of the sub-pixel columns SPXC, there will be no situation where polarities of a plurality of the sub-pixels SPX with a same display color and a high grayscale data compensation state H are all either positive + or negative −, thereby decreasing differences in terms of polarities between a plurality of the sub-pixels SPX with a same display color and a high grayscale data compensation state H in four adjacent sub-pixel columns SPXC, which mitigates head-shaking lines observed by human eyes with a shaking head as a result of an area having a large difference in polarity. For example, in a plurality of the second sub-pixels G having a high grayscale data compensation state H in the first column and the second column of the sub-pixel columns SPXC, polarities of the second sub-pixels G in the first column are negative polarity "−" and positive polarity "+", polarities of the second sub-pixels G in the second column are positive polarity "+" and negative polarity "−".

And, when sub-pixels SPX with the same display color and high grayscale data compensation state H are illuminated within a same frame to display a same grayscale, absolute values of average effective voltages of two adjacent ones of the data lines DL are the same. For example, when green sub-pixels having a high grayscale data compensation state H is illuminated within a same frame, a voltage of the first data line DL may be expressed as: 0-(H−)-0-0-0-0-0-(H−)-0-0-0-0 . . . , and a voltage of the second data line DL may be expressed as: 0-0-0-0-(H+)-0-0-(H+)-0-0-0-0 . . . , so that the average effective voltages of the first data line DL and the second data line DL within the same frame are the same in magnitude and opposite in polarity. As such, a probability of occurrence of vertical crosstalk phenomenon may be effectively reduced.

Embodiment 2

Referring to FIG. 4, this embodiment is similar to Embodiment 1, except that in this embodiment, n is 2. That is, in each of the sub-pixel columns SPXC, four sub-pixels SPX are interspersed to flip pixel polarity. In other embodiments, n may be 3, 4, 5 and so on.

As such, in any two adjacent ones of the sub-pixel columns SPXC, there will be no situation where polarities of a plurality of the sub-pixels SPX with a same display color and a high grayscale data compensation state H are all either positive + or negative −, thereby decreasing differences in terms of polarities between a plurality of the sub-pixels SPX with a same display color and a high grayscale data compensation state H in four adjacent sub-pixel columns SPXC, which mitigates head-shaking lines observed by human eyes with a shaking head as a result of an area having a large difference in polarity. For example, in a plurality of the second sub-pixels G having a high grayscale data compensation state H in the first column and the second column of the sub-pixel columns SPXC, polarities of the second sub-pixels G in the first column are negative polarity "−" and positive polarity "+", polarities of the second sub-pixels G in the second column are negative polarity "−" and positive polarity "+".

Embodiment 3

Referring to FIG. 5, in the present embodiment, n is 0. Since n=0, the original second sub-pixel group does not exist, so that each of the sub-pixel columns SPXC is connected to a corresponding one of the data lines DL. Polarities of a plurality of the sub-pixels SPX in a plurality of the sub-pixel groups SPXG connected to a same one of the data lines DL are the same, and polarities of a plurality of the sub-pixels SPX in a plurality of the sub-pixel groups SPXG connected to two adjacent ones of the data lines DL are opposite. As such, the present embodiment provides a new design in which sub-pixels SPX of a same sub-pixel column SPXC have the same polarity.

In a same one of the sub-pixel columns SPXC, grayscale data compensation states of two adjacent ones of the sub-pixels SPX are opposite. For example, in the first three sub-pixels SPX in a first column of the sub-pixel columns SPXC, grayscale data compensation states of the first sub-pixel B, the second sub-pixel G, and the third sub-pixel R are a low grayscale data compensation state L, a high grayscale data compensation state H, and the low grayscale data compensation state L, respectively. In a same one of the sub-pixel rows SPXR, the grayscale data compensation states of two adjacent ones of the sub-pixels SPX alternate between being opposite and being the same. For example, in the first six sub-pixels SPX in a first row of the sub-pixel rows SPXR, grayscale data compensation states of the six sub-pixels SPX are a low grayscale data compensation state L, a high grayscale data compensation state H, the high grayscale data compensation state H, the low grayscale data compensation state L, the low grayscale data compensation state L, and the high grayscale data compensation state H.

As such, in any two adjacent ones of the sub-pixel columns SPXC, there will be no situation where polarities of a plurality of the sub-pixels SPX with a same display color and a high grayscale data compensation state H are all either positive + or negative −, thereby decreasing differences in terms of polarities between a plurality of the sub-pixels SPX with a same display color and a high grayscale data compensation state H in four adjacent sub-pixel columns SPXC, which mitigates head-shaking lines observed by human eyes with a shaking head as a result of an area having a large difference in polarity. For example, in a plurality of the second sub-pixels G having a high grayscale data compensation state H in the first column and the second column of the sub-pixel columns SPXC, polarities of the second sub-pixels G in the first column are negative polarity "−" and negative polarity "−", polarities of the second sub-pixels G in the second column are positive polarity "+" and positive polarity "+".

And, when sub-pixels SPX with the same display color and high grayscale data compensation state H are illuminated within a same frame to display a same grayscale, absolute values of average effective voltages of two adjacent ones of the data lines DL are the same. For example, when green sub-pixels having a high grayscale data compensation state H is illuminated within a same frame, a voltage of the first data line DL may be expressed as: 0-(H−)-0-0-0-0-(H−)-0-0-0-0 . . . , and a voltage of the second data line DL may be expressed as: 0-0-0-0-(H+)-0-0-(H+)-0-0-0-0 . . . , so that the average effective voltages of the first data line DL and the second data line DL within the same frame are the same in magnitude and opposite in polarity. As such, a probability of occurrence of vertical crosstalk phenomenon may be effectively reduced.

Embodiment 4

Figure 6:
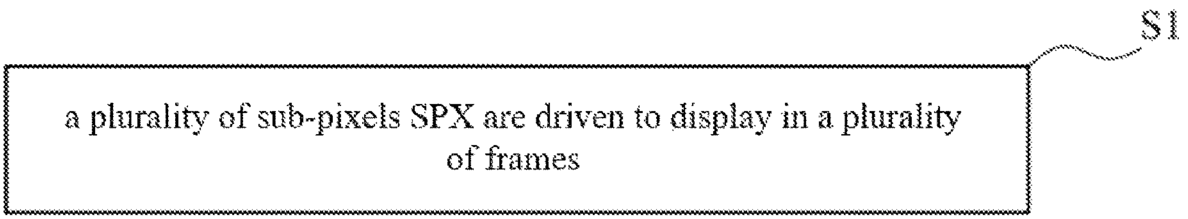
FIG. 6 is a flow diagram of a method for driving a display panel according to an embodiment of the present disclosure.

Referring to FIG. 6, an embodiment of the present disclosure further provides a method for driving a display panel which may be applied to the display device 1 as described above to drive the display panel 2. The method may be implemented by the source drive chip 41 executing corresponding program instructions. The method includes step S1.

At step S1, a plurality of sub-pixels SPX are driven to display in a plurality of frames.

Where each of the sub-pixels SPX has a high grayscale data compensation state H and a low grayscale data compensation state L, and has a positive polarity "+" and a negative polarity "−" within the plurality of frames.

Each of the sub-pixel columns SPXC includes a plurality of sub-pixel groups SPXG. 2n sub-pixels of the sub-pixels SPX are provided between every two of the sub-pixel groups SPXG connected to a corresponding one of the data lines DL, and the 2n sub-pixels of the sub-pixels SPX are connected to an another adjacent one of the data lines DL, with n being an integer. That is, the present embodiment provides a new design in which an even number of sub-pixels SPX are interspersed in each pixel column to flip pixel polarity.

Based on the new design described above, in a same frame, among a plurality of the sub-pixels SPX, in any two adjacent ones of the sub-pixel columns SPXC, whose display colors are the same and have a high grayscale data compensation state H, at least one of the sub-pixels SPX has a polarity different from that of other ones of the sub-pixels SPX.

As such, in any two adjacent ones of the sub-pixel columns SPXC, there will be no situation where polarities of a plurality of the sub-pixels SPX with a same display color and a high grayscale data compensation state H are all either positive + or negative −, thereby decreasing differences in terms of polarities between a plurality of the sub-pixels SPX with a same display color and a high grayscale data compensation state H in four adjacent sub-pixel columns SPXC, which mitigates head-shaking lines observed by human eyes with a shaking head as a result of an area having a large difference in polarity.

Further, polarities of a plurality of the sub-pixels SPX of a plurality of the sub-pixel groups PXG are flipped every p frames, with p being a positive integer, such as 1, 2, and 3. As such, polarity symmetry in time dimension may be achieved.

Embodiment 5

An embodiment of the present disclosure further provides a drive chip configured to execute program instructions to implement the method described above. Specifically, the drive chip may be a source drive chip or a timing control chip.

As such, in a same frame, among a plurality of the sub-pixels SPX, in any two adjacent ones of the sub-pixel columns SPXC, whose display colors are the same and have a high grayscale data compensation state H, at least one of the sub-pixels SPX has a polarity different from that of other ones of the sub-pixels SPX.

As such, in any two adjacent ones of the sub-pixel columns SPXC, there will be no situation where polarities of a plurality of the sub-pixels SPX with a same display color and a high grayscale data compensation state H are all either positive + or negative −, thereby decreasing differences in terms of polarities between a plurality of the sub-pixels SPX with a same display color and a high grayscale data compensation state H in four adjacent sub-pixel columns SPXC, which mitigates head-shaking lines observed by human eyes with a shaking head as a result of an area having a large difference in polarity.

Embodiments of the present disclosure have been described in detail, and specific examples have been used herein to illustrate the principles and embodiments of the present disclosure. The description of the above embodiments is merely provided to assist in understanding the method of the present disclosure and its core idea. At the same time, variations in the detailed description and scope of application will occur to those skilled in the art in accordance with the teachings of the present disclosure, and in light of the foregoing, the specification is not to be construed as limiting the present disclosure.

What is claimed is:

1. A method for driving a display panel, the display panel comprising a plurality of data lines and a plurality of sub-pixels electrically connected to the plurality of data lines; the plurality of the sub-pixels including a plurality of first sub-pixels, a plurality of second sub-pixels, and a plurality of third sub-pixels, the plurality of sub-pixels being arranged in intersecting row and column directions to form a plurality of sub-pixel rows arranged in the column direction, and to form a plurality of sub-pixel columns arranged in the row direction, the plurality of sub-pixel rows including a plurality of first sub-pixel rows, a plurality of second sub-pixel rows, and a plurality of third sub-pixel rows that are alternately arranged, display colors of a plurality of the sub-pixels in a same one of the sub-pixel rows being the same, display colors of the sub-pixels in the first sub-pixel row, display colors of the sub-pixels in the second sub-pixel row, and display colors of the sub-pixels in the third sub-pixel row being different; the method comprising:

driving a plurality of the sub-pixels to display in a plurality of frames, wherein each of the sub-pixels has one of a high grayscale data compensation state and a low grayscale data compensation state and has one of a positive polarity and a negative polarity in each of the frames;

wherein each of the sub-pixel columns includes a plurality of sub-pixel groups including a first sub-pixel group, a third sub-pixel group, and a second sub-pixel group located between the first sub-pixel group and the third sub-pixel group, the first sub-pixel group and the third sub-pixel group being connected to a corresponding one of the data lines, the second sub-pixel group being connected to another adjacent one of the data lines and including 2n sub-pixels of the plurality of sub-pixels, with n being an integer greater than or equal to 0;

wherein in a same frame, among a plurality of the sub-pixels, in any two adjacent ones of the sub-pixel columns, whose display colors are the same and have the high grayscale data compensation state, at least one of the sub-pixels has a polarity different from that of other ones of the sub-pixels.

2. The method of claim 1, wherein n is a positive integer, and wherein each of the sub-pixel groups includes 2n sub-pixels of the plurality of sub-pixels.

3. The method of claim 2, wherein polarities of a plurality of the sub-pixels of a plurality of the sub-pixel groups connected to a same one of the data lines are the same, and the polarities of the plurality of the sub-pixels of the plurality of the sub-pixel groups connected to the same data line are opposite to polarities of a plurality of the sub-pixels of a plurality of the sub-pixel groups connected to another adjacent one of the data lines.

4. The method of claim 3, wherein n=1, and wherein among a plurality of the sub-pixels, in a same one of the sub-pixel columns, whose display colors are the same and have the high grayscale data compensation state, two adjacent ones of the sub-pixels have opposite polarities.

5. The method of claim 4, wherein, in a same frame, in a case that sub-pixels with a same display color and having the high grayscale data compensation state display a same grayscale, absolute values of average effective voltages of two adjacent ones of the data lines are the same.

6. The method of claim 1, wherein n=0, and wherein each of the sub-pixel columns is connected to a corresponding one of the data lines; polarities of a plurality of the sub-pixels in a plurality of the sub-pixel groups connected to a same one of the data lines are the same, and the polarities of the plurality of the sub-pixels in the plurality of the sub-pixel groups connected to the same data line are opposite to polarities of a plurality of the sub-pixels of a plurality of the sub-pixel groups connected to another adjacent one of the data lines.

7. The method of claim 1, wherein in a same one of the sub-pixel columns, grayscale data compensation states of two adjacent one of the sub-pixels are opposite; in a same one of the sub-pixel rows, the grayscale data compensation states of two adjacent ones of the sub-pixels alternate between being opposite and being the same.

8. A drive chip configured to execute program instructions to implement a method for driving a display panel, the display panel comprising a plurality of data lines and a plurality of sub-pixels electrically connected to the plurality of data lines; the plurality of the sub-pixels including a plurality of first sub-pixels, a plurality of second sub-pixels, and a plurality of third sub-pixels, the plurality of sub-pixels being arranged in intersecting row and column directions to form a plurality of sub-pixel rows arranged in the column direction, and to form a plurality of sub-pixel columns arranged in the row direction, the plurality of sub-pixel rows including a plurality of first sub-pixel rows, a plurality of second sub-pixel rows, and a plurality of third sub-pixel rows that are alternately arranged, display colors of a plurality of the sub-pixels in a same one of the sub-pixel rows being the same, display colors of the sub-pixels in the first sub-pixel row, display colors of the sub-pixels in the second sub-pixel row, and display colors of the sub-pixels in the third sub-pixel row being different; the method comprising:

driving a plurality of the sub-pixels to display in a plurality of frames, wherein each of the sub-pixels has one of a high grayscale data compensation state and a low grayscale data compensation state and has one of a positive polarity and a negative polarity in each of the frames;

wherein each of the sub-pixel columns includes a plurality of sub-pixel groups including a first sub-pixel group, a third sub-pixel group, and a second sub-pixel group located between the first sub-pixel group and the third sub-pixel group, the first sub-pixel group and the third sub-pixel group being connected to a corresponding one of the data lines, the second sub-pixel group being connected to another adjacent one of the data lines and including 2n sub-pixels of the plurality of sub-pixels, with n being an integer greater than or equal to 0;

wherein in a same frame, among a plurality of the sub-pixels, in any two adjacent ones of the sub-pixel columns, whose display colors are the same and have the high grayscale data compensation state, at least one of the sub-pixels has a polarity different from that of other ones of the sub-pixels.

9. The drive chip of claim 8, wherein n is a positive integer, and wherein each of the sub-pixel groups includes 2n sub-pixels of the plurality of sub-pixels.

10. The drive chip of claim 9, wherein polarities of a plurality of the sub-pixels of a plurality of the sub-pixel groups connected to a same one of the data lines are the same, and the polarities of the plurality of the sub-pixels of the plurality of the sub-pixel groups connected to the same data line are opposite to polarities of a plurality of the sub-pixels of a plurality of the sub-pixel groups connected to another adjacent one of the data lines.

11. The drive chip of claim 10, wherein n=1, and wherein among a plurality of the sub-pixels, in a same one of the sub-pixel columns, whose display colors are the same and have the high grayscale data compensation state, two adjacent ones of the sub-pixels have opposite polarities.

12. The drive chip of claim 11, wherein, in a same frame, in a case that sub-pixels with a same display color and having the high grayscale data compensation state display a same grayscale, absolute values of average effective voltages of two adjacent ones of the data lines are the same.

13. The drive chip of claim 8, wherein n=0, and wherein each of the sub-pixel columns is connected to a corresponding one of the data lines; polarities of a plurality of the sub-pixels in a plurality of the sub-pixel groups connected to a same one of the data lines are the same, and the polarities of the plurality of the sub-pixels in the plurality of the sub-pixel groups connected to the same data line are opposite to polarities of a plurality of the sub-pixels of a plurality of the sub-pixel groups connected to another adjacent one of the data lines.

14. The drive chip of claim 8, wherein in a same one of the sub-pixel columns, grayscale data compensation states of two adjacent one of the sub-pixels are opposite; in a same one of the sub-pixel rows, the grayscale data compensation states of two adjacent ones of the sub-pixels alternate between being opposite and being the same.

15. A display device comprising:

a display panel; and a drive chip electrically connected to the display panel and configured to execute program instructions to implement a method for driving a display panel, the display panel comprising a plurality of data lines and a plurality of sub-pixels electrically connected to the plurality of data lines; the plurality of the sub-pixels including a plurality of first sub-pixels, a plurality of second sub-pixels, and a plurality of third sub-pixels, the plurality of sub-pixels being arranged in intersecting row and column directions to form a plurality of sub-pixel rows arranged in the column direction, and to form a plurality of sub-pixel columns arranged in the row direction, the plurality of sub-pixel rows including a plurality of first sub-pixel rows, a plurality of second sub-pixel rows, and a plurality of third sub-pixel rows that are alternately arranged, display colors of a plurality of the sub-pixels in a same one of the sub-pixel rows being the same, display colors of the sub-pixels in the first sub-pixel row, display colors of the sub-pixels in the second sub-pixel row, and display colors of the sub-pixels in the third sub-pixel row being different; the method comprising:

driving a plurality of the sub-pixels to display in a plurality of frames, wherein each of the sub-pixels has one of a high grayscale data compensation state and a low grayscale data compensation state and has one of a positive polarity and a negative polarity in each of the frames;

wherein each of the sub-pixel columns includes a plurality of sub-pixel groups including a first sub-pixel group, a third sub-pixel group, and a second sub-pixel group located between the first sub-pixel group and the third sub-pixel group, the first sub-pixel group and the third sub-pixel group being connected to a corresponding one of the data lines, the second sub-pixel group being connected to another adjacent one of the data lines and including 2n sub-pixels of the plurality of sub-pixels, with n being an integer greater than or equal to 0;

wherein in a same frame, among a plurality of the sub-pixels, in any two adjacent ones of the sub-pixel columns, whose display colors are the same and have the high grayscale data compensation state, at least one of the sub-pixels has a polarity different from that of other ones of the sub-pixels.

16. The display device of claim 15, wherein n is a positive integer, and wherein each of the sub-pixel groups includes 2n sub-pixels of the plurality of sub-pixels.

17. The display device of claim 16, wherein polarities of a plurality of the sub-pixels of a plurality of the sub-pixel groups connected to a same one of the data lines are the same, and the polarities of the plurality of the sub-pixels of the plurality of the sub-pixel groups connected to the same data line are opposite to polarities of a plurality of the sub-pixels of a plurality of the sub-pixel groups connected to another adjacent one of the data lines.

18. The display device of claim 17, wherein n=1, and wherein among a plurality of the sub-pixels, in a same one of the sub-pixel columns, whose display colors are the same and have the high grayscale data compensation state, two adjacent ones of the sub-pixels have opposite polarities.

19. The display device of claim 18, wherein, in a same frame, in a case that sub-pixels with a same display color and having the high grayscale data compensation state display a same grayscale, absolute values of average effective voltages of two adjacent ones of the data lines are the same.

20. The display device of claim 15, wherein n=0, and wherein each of the sub-pixel columns is connected to a corresponding one of the data lines; polarities of a plurality of the sub-pixels in a plurality of the sub-pixel groups connected to a same one of the data lines are the same, and the polarities of the plurality of the sub-pixels in the plurality of the sub-pixel groups connected to the same data line are opposite to polarities of a plurality of the sub-pixels of a plurality of the sub-pixel groups connected to another adjacent one of the data lines.

* * * * *